United States Patent [19]
Hamada et al.

[11] Patent Number: 6,028,297
[45] Date of Patent: Feb. 22, 2000

[54] RICE COOKER

[75] Inventors: Hironori Hamada; Megumi Arihisa, both of Kobe; Mitsuru Takechi; Masahiro Koyama, both of Sanda, all of Japan

[73] Assignee: Matsushita Electric Industrial Co., Ltd., Osaka, Japan

[21] Appl. No.: 09/096,253

[22] Filed: Jun. 11, 1998

[30] Foreign Application Priority Data

| Jun. 13, 1997 | [JP] | Japan | 9-156551 |
| Aug. 21, 1997 | [JP] | Japan | 9-225338 |
| Aug. 26, 1997 | [JP] | Japan | 9-229706 |
| Aug. 26, 1997 | [JP] | Japan | 9-229709 |

[51] Int. Cl.[7] .................................................. H05B 6/12
[52] U.S. Cl. ...................... 219/625; 219/497; 99/DIG. 14
[58] Field of Search .................................... 219/497, 501, 219/506, 625, 496, 492, 441; 99/DIG. 14, 426, 333, 327, 332, 335, 403, 326, 331

[56] References Cited

U.S. PATENT DOCUMENTS

| 4,644,137 | 2/1987 | Asahi et al. | 219/497 |
| 5,701,805 | 12/1997 | Sa | 99/331 |
| 5,829,341 | 11/1998 | Lin | 99/326 |

*Primary Examiner*—Teresa Walberg
*Assistant Examiner*—Jeffrey Pwu
*Attorney, Agent, or Firm*—Ratner & Prestia

[57] ABSTRACT

A rice cooker does not cause malfunction if the operation unit is touched by mistake when closing the lid, and is capable of preventing boil-over without lowering the rice cooking performance. The rice cooker includes a main body, a lid for covering the top of the main body, an inner pan detachably accommodated in the main body, a heater for induction heating of the inner pan, a controller for controlling the supply of high frequency power to the heater, an operating unit, and a lid opening and closing detector or a rice gruel detector disposed in a steam tube of the lid. The controller inhibits operation signal input of the operating unit when detecting an open state of the lid, and controls the power supply to the heater when detecting a rise in the rice gruel. Therefore, the rice cooker prevents a wrong input in rice cooking when opening or closing the lid, and prevents boil-over of the rice gruel.

19 Claims, 8 Drawing Sheets

RICE COOKER

FIELD OF THE INVENTION

The present invention relates to a rice cooker having a microcomputer for general household or professional use.

BACKGROUND OF THE INVENTION

Recently, rice cookers for cooking rice with high power for enhancing the rice cooking performance have been developed and distributed widely. There are also rice cookers capable of cooking rice at different levels of softness by the same amount of water.

Conventionally, this kind of rice cooker was composed as shown in FIG. 8. In FIG. 8, a body (rice cooker main body) 1 is a cylindrical structure having an open top, and inside of the body 1 is disposed a protective frame 2 which accommodates an inner pan 3. The protective frame 2 is a cylindrical structure with a bottom made of nonmetallic material, and the upper end of the protective frame 2 is engaged with the inner circumference of the upper end of the body 1.

The inner pan 3 has a flange 4 projecting outside at the opening of the upper end, and this inner pan 3 is disposed detachably in the protective frame 2, by mounting the flange 4 on the top of an upper frame 5 in a suspended state. At the outside of the protective frame 2, an induction coil 6 for heating the inner pan 3 is disposed, and this induction coil 6 is supported by a coil cover 7 formed of a heat resistant resin material in the lower part of the outer circumference of the protective frame 2 so that the distance to the outer circumference of the inner pan 3 may be constant. In the center of the induction coil 6, a pan sensor 8 for detecting the temperature of the inner pan 3 is disposed.

An outer lid 9 made of synthetic resin is rotatably supported on a hinge member 10 formed integrally on the top of the upper frame 5 through a pin 11. An inner cover 12 is affixed at the inside of the outer lid 9. A heat releasing plate 13, being a heating element, is fixed to the inner cover 12, and an induction coil 15 supported by a coil support stand 14 is positioned on the top of this heat releasing plate 13. By the electromagnetic action of this induction coil 15, the heat releasing plate 13 generates heat. To this heat releasing plate 13, a lid sensor 16 for detecting the temperature of the heat releasing plate 13 is directly adhered with an aluminum tape, and the temperature of the heat releasing plate 13 is detected.

An engaging member 17 is positioned on the opposite side of the hinge member 10 and is formed integrally on the upper end of the protective frame 2, and confronting to this engaging member 17, an engaging lever 18 is rotatably supported on the outer lid 9 through a lever pin 19. A pan packing 20 is to enclose the inner pan 3 by pressing to the flange 4 of the inner pan 3 when the outer lid 9 is closed. A steam tube 21 provided in the center of the outer lid 9 is to prevent rice gruel from boiling over to outside.

A control board 22 is to control power feed to the induction coils 6, 12, and also control input and output of signals from the pan sensor 8 and lid sensor 16 and signal of operation display unit 23 provided before the top of the body 1. A cooling fan 24 is to cool the induction coil 6 and control board 22. The control board 22 judges the amount of rice and water in the inner pan 3 in the rice cooking amount judging process while cooking rice by the temperature detection signal from the lid sensor 16, and determines the power feed state to the induction coil 6 depending on the result of judging.

In the conventional rice cooker having such constitution, however, when detaching or attaching the inner pan 3, it is necessary to open or close the outer lid 9, and particularly when closing the outer lid 9, the front side of the body 1 on the top of the outer lid 9 must be held down. At this time, if the operation display unit 23 is located on the top of the outer lid 9 in a range possibly held by hand, an operation key may be pressed by mistake.

In such rice cooker, if the outer lid 9 is opened in the midst of cooking rice, the lid sensor 16 cannot detect the temperature in the inner pan 3 correctly, and the rice cooking amount cannot be judged normally, so that optimum rice cooking suited to the rice cooking amount is not guaranteed.

Moreover, since the heat is high, to cook the rice soft, in particular, if more water is added than usual for cooking rice, it often causes boiling-over.

SUMMARY OF THE INVENTION

It is hence a first object of the invention to realize a rice cooker constituted so as to prevent wrong operation if the operation unit is touched by mistake when closing the lid.

It is a second object of the invention to realize a rice cooker capable of preventing from being unable to cook rice optimally due to opening of lid in the midst of cooking rice.

It is a third object of the invention to realize a rice cooker capable of preventing boiling-over, without lowering the rice cooking performance, by detecting rice gruel rising over the inner pan.

To achieve the objects, the rice cooker of the invention comprises a rice cooker main body (hereinafter called main body), a lid to cover the top of the main body, an inner pan detachably accommodated in the main body, heating means for heating the inner pan, control means for supplying and controlling an electric power to the heating means, and an operation unit for entering at least manipulation for start of rice cooking and manipulation for selection of rice cooking function, in which the control means is constituted to inhibit at least one manipulation input of the operation unit when detecting the open state of the lid. In this constitution, if the key in the operation unit is pressed by mistake in open state of the lid or in the process of closing the lid, malfunction can be prevented.

In particular, by constituting the control means so as to inhibit instruction input of start of rice cooking when detecting open state of the lid, if the rice cooking start key is pressed by mistake in open state of the lid or in the process of closing the lid, malfunction can be prevented. Besides, even in the open state of the lid, it is possible to cancel hot keeping or select menu.

In the rice cooker of the invention, it is preferred to comprise further display means for displaying the state of the rice cooking function and the open or closed state of the lid. Therefore, it is known how the control means judges the open or closed state of the lid.

Preferably, the control means is constituted so as to notice when a manipulation signal of the operation unit is entered when the lid is open. Therefore, if the key in the operation unit is pressed by mistake in open state of the lid or in the process of closing the lid, malfunction can be prevented, and if the key in the operation unit is pressed in the open state of the lid, it is noticed that the key operation is not accepted.

Preferably, the control means is constituted so as to inhibit input of manipulation signal of the operation unit for a specific time even after the lid is closed. Therefore, malfunction can be prevented securely when closing the lid.

Preferably, the control means is constituted so as to permit input of manipulation signal of the operation unit, if the lid is open, as far as a specific manipulation signal of the operation unit is entered, so that normal key operation is possible if the lid opening or closing detecting means is defective.

Preferably, the control means is constituted so as to notice when the open state of the lid is detected for a specific time in a specific process during rice cooking, so that it is possible to prevent from being unable to cook rice optimally due to opening of the lid in the mist of rice cooking.

Other aspect of the rice cooker of the invention comprises an inner pan for containing the material, heating means for heating the inner pan, rice gruel detecting means for detecting rise of rice gruel above the upper end of the inner pan, and heating control means for controlling the heating means, in which the heating control means is constituted so as to change the heating capacity of the heating means depending on the state of detection by the rice gruel detecting means. Therefore, in this constitution, when rise of rice gruel over the inner pan is detected, it is prevented from boiling over due to further increase of rice gruel.

Preferably, the heating control means is constituted so as to stop heating by the heating means during detection period of rise of rice gruel by the rice gruel detecting means. Therefore, rise of rice gruel and presence or absence of heating by heating means cooperate at the same timing, and control is easier.

Preferably, the heating control means is constituted so as to stop heating by the heating means for a specific time after detecting that the rice gruel no longer rises by the rice gruel detecting means. Therefore, the rice gruel can be returned to the inner pan securely until the rise of rice gruel does not occur soon.

The rice cooker of the invention further comprises failure detecting means for detecting failure of the rice gruel detecting means, in which the heating control means is constituted so as to change the heating capacity of the heating means when failure is detected by the failure detecting means. Therefore, in the event of failure of rice gruel detecting means, rice cooking can be finished normally without lowering the rice cooking performance by extremely decreasing the heating capacity or without allowing boiling-over.

In particular, when failure of rice gruel detecting means is detected by the failure detecting means, the heating control means is constituted so as not to start rice cooking operation, and therefore the rice gruel detecting means is always normal during heating in rice cooking process, thereby preventing lowering of rice cooking performance by lowering the heating capacity although the rice gruel does not rise, or boiling over due to failure of detection although the rice gruel is actually rising without knowing the failure of the rice gruel detecting means.

Preferably, the rice cooker of the invention further comprises input means for entering into the heating control means, in which the heating control means is constituted so as to change the state of the rice cooker by input of plural times when failure is detected by the failure detecting means. Therefore, by changing the state by input of plural times in the event of failure of the rice gruel detecting means, the user recognizes an abnormal state and can start operation.

In particular, when the heating control means is constituted so as to invalidate the inputs made so far when input of plural times is not done within a specific time, by making valid only when pressed within a specific time, change of state of the rice cooker by a single input if entered after a long time can be prevented.

If the failure detecting means is constituted so as to judge failure when rise of rice gruel is detected continuously for more than a specific time by the rice gruel detecting means, failure detecting means is not separately required, and the constitution is simplified.

Preferably, the heating control means is constituted so as to control the heating means, regardless of the detecting result of the rice gruel detecting means, when the temperature in the rice cooker is within a specified range. Therefore, the heating capacity is adjusted only at temperature possible to cause boiling-over, and change of heating capacity due to detection error in unnecessary temperature range can be prevented.

Preferably, the heating control means is constituted so as to control the heating means, regardless of the detecting result of the rice gruel detecting means, when the cooking time is within a specified range. As a result, as far as there is no possibility of boiling-over, the heating capacity by the rice gruel detecting means is not adjusted, so that change of heating capacity due to detection error when not necessary can be prevented.

Preferably, the heating control means is constituted so as to control the heating means, regardless of the detecting result of the rice gruel detecting means, in a specific rice cooking process, thereby preventing change of heating capacity due to detection error in the rice cooking process not necessary to change the heating capacity due to boiling-over.

The rice cooker of the invention further comprises display means for displaying or noticing the state of the rice cooker, and display control means for controlling the display means, in which the display control means is constituted so as to change the operation of the display means depending on at least one detection state of the rice gruel detecting means and failure detecting means, so that the detection state is displayed to tell the operation to the user.

DESCRIPTION OF THE PREFERRED EMBODIMENTS

Embodiment 1

A first embodiment of the invention is described by referring to FIG. 1 to FIG. 4.

Figure 1:
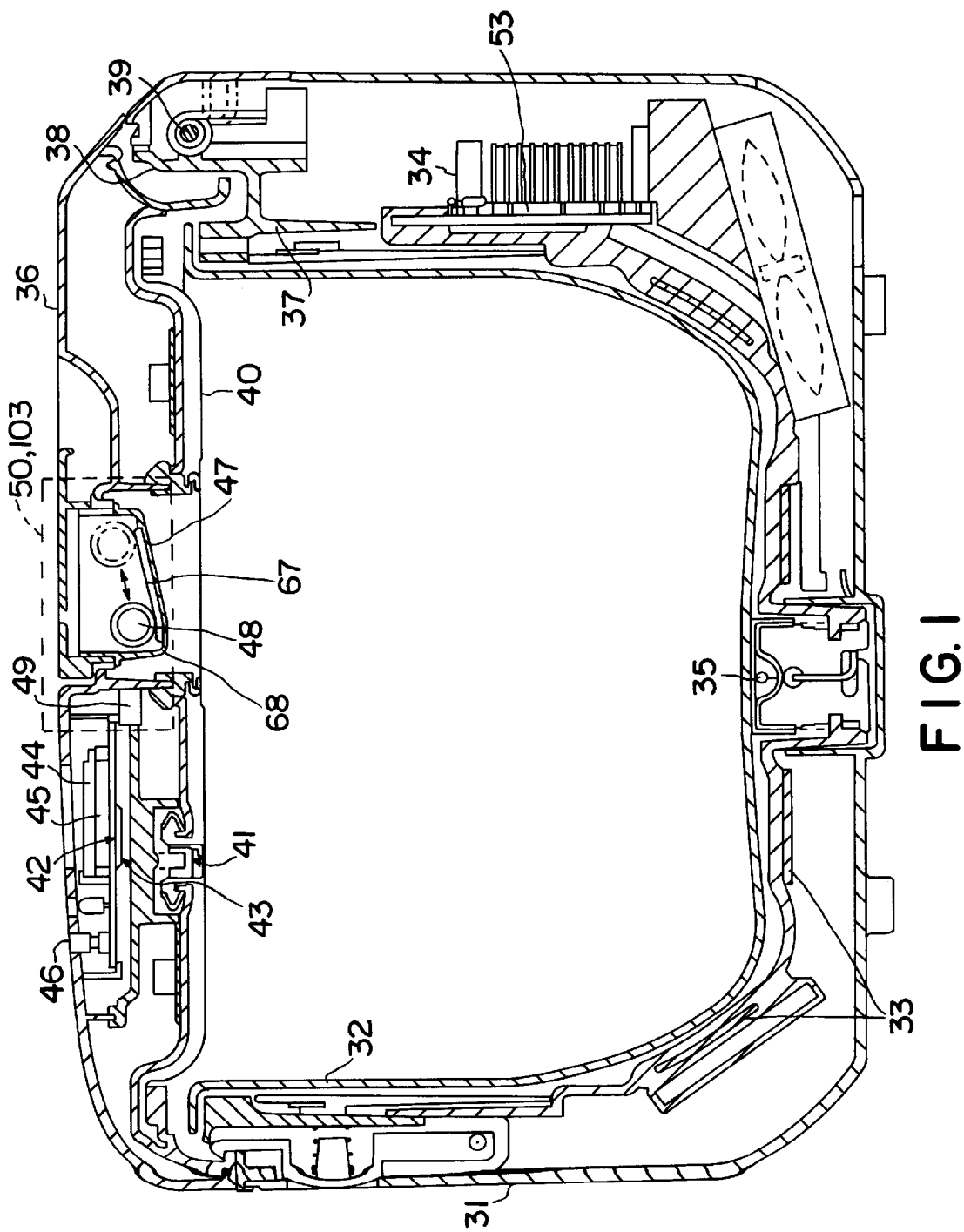
FIG. 1 is a longitudinal sectional view of a rice cooker in embodiments 1 to 7 of the invention.

As shown in FIG. 1, inside of a rice cooker main body (hereinafter called main body) 31 having an opening in the top, an inner pan 32 for containing rice and water is detachably accommodated. In the main body 31, further, heating means 33 having a heating coil for heating the inner pan 32, and an inverter board 34 mounting an inverter for driving the heating means 33 are disposed. In the center of the heating means 33, a pan sensor 35 for detecting the temperature of bottom of the inner pan 32 is disposed. In the top opening of the rice cooker main body 31, a lid 36 to cover it by opening and closing is provided, and the lid 36 is rotatably supported on a hinge member 38 integrally formed in the top of an upper frame 37 through a pin 39.

A cooling plate 40 is fixed to the lid 36, and a lid sensor 41 for detecting the temperature of the lid 36 and in the inner pan 32 is provided in tight contact with the cooling plate 40. A control board 42 is disposed in the lid 36. The control board 42 incorporates a microcomputer 43 as heating control means, a liquid crystal display (LCD) 44 as display means, a buzzer 45 as noticing means, and operation means 46.

Further in the lid 36 is disposed lid opening and closing detecting means 50 composed of a float 48 provided in a steam tube 47 and a float detecting unit 49 disposed at the lid front side around the steam tube 47. The lid opening and closing detecting means 50 can also function as the rice gruel detecting means when cooking rice as described later, or function as combined detecting means for detection of lid opening and closing and detection of rice gruel.

Figure 2:
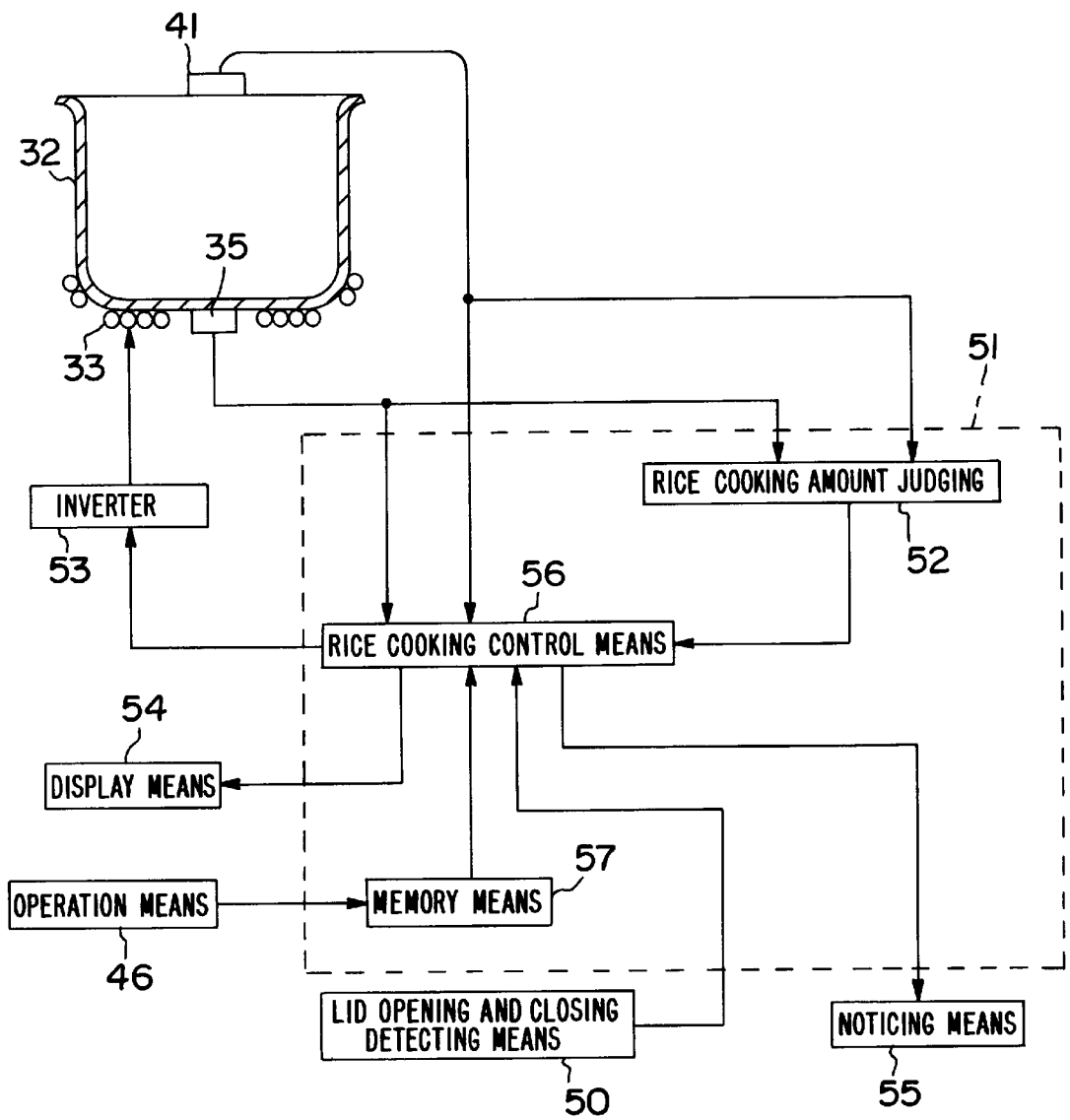
FIG. 2 is a block diagram of this rice cooker.

In FIG. 2, control means 51 which is the microcomputer 43 comprises rice cooking amount judging means 52 for receiving the signal from the lid opening and closing detecting means 50, and receiving the output of the pan sensor 35 and the output of the lid sensor 41, and judging the amount of rice and water in the inner pan 32, that is, the rice cooking amount, rice cooking control means 56 for determining the heating output of the heating means 33 depending on the output of the cooking amount judging means 52, receiving the output of the pan sensor 35 and output of the lid sensor 41 together with the input signal from the lid opening and closing detecting means 50, controlling the heating output of the heating means 33 by controlling an inverter 53 according to the rice cooking sequence, and issuing signals to display means 54 having the LCD 44 for displaying the state of the rice cooker and to noticing means 55 having the buzzer 45 for noticing abnormality or the like of the rice cooker, and memory means 57 for storing the rice cooking sequence.

The operation means 46 selects the rice cooking sequence stored in the memory means 57 in the microcomputer 43, or issues the rice cooking start signal to the memory means 57 in the microcomputer 43.

Figure 3:
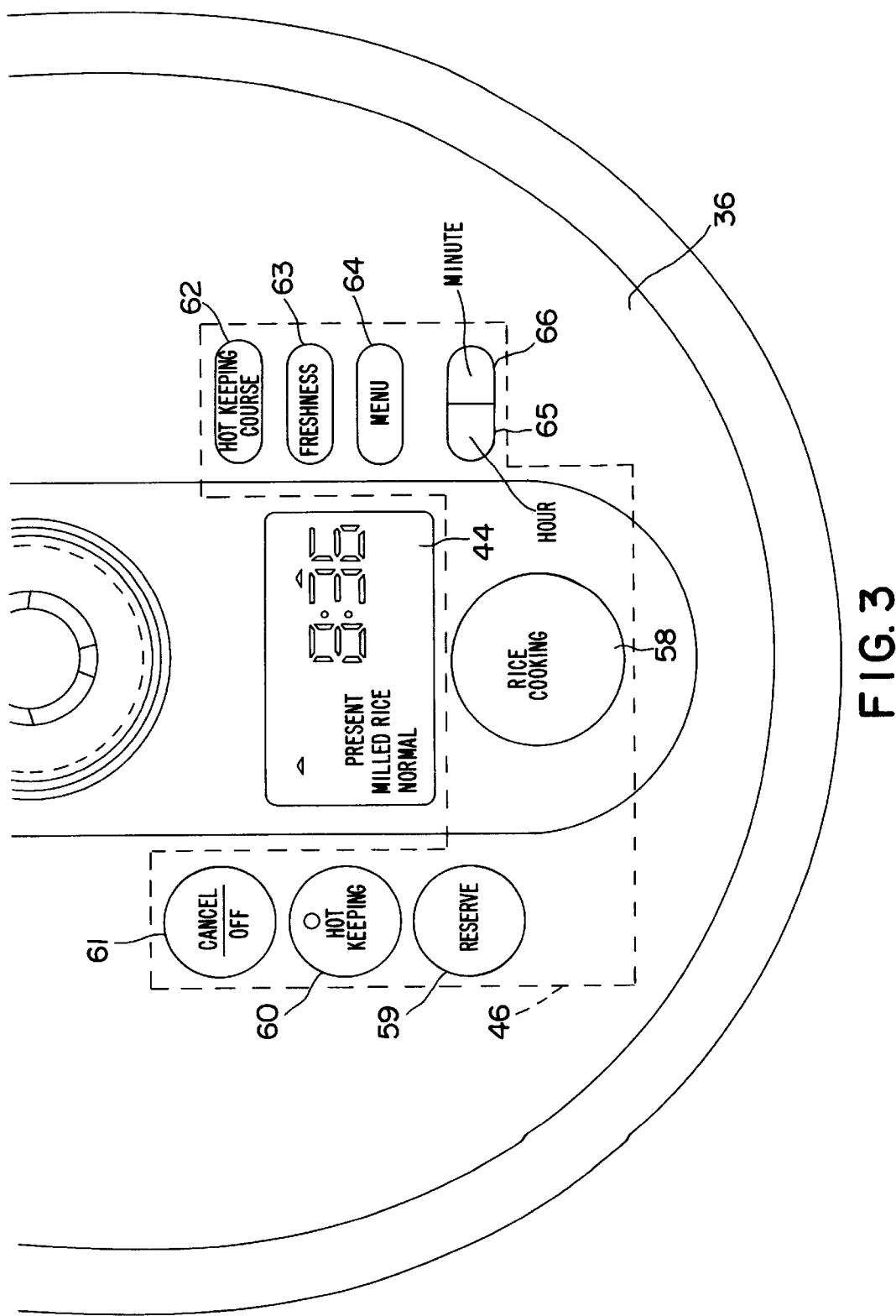
FIG. 3 is an appearance view of the front part of the top of the lid of this rice cooker.

FIG. 3 is an appearance view of the lid front part when seeing the lid 36 of the rice cooker of the embodiment from top. As shown in the drawing, in the upper front part of the lid 36 there are disposed display means 54, that is, the LCD 44 for displaying the present time, the selected hot keeping course, freshness of rice, rice cooking menu, and open or closed state of the lid 36, and operation means 46 including a rice cooking key 58 for starting rice cooking, a reserve key 59 for reserved rice cooking, a hot keeping key 60 for starting hot keeping, a cancel key 61 for canceling rice cooking or hot keeping, a hot keeping course key 62 for selecting the temperature of hot keeping, a freshness key 63 for selecting an optimum rice cooking sequence according to the state of the rice, a menu key 64 for selecting the rice cooking menu, and an hour key 65 and a minute key 66 for changing the time displayed on the LCD 44.

Figure 4:
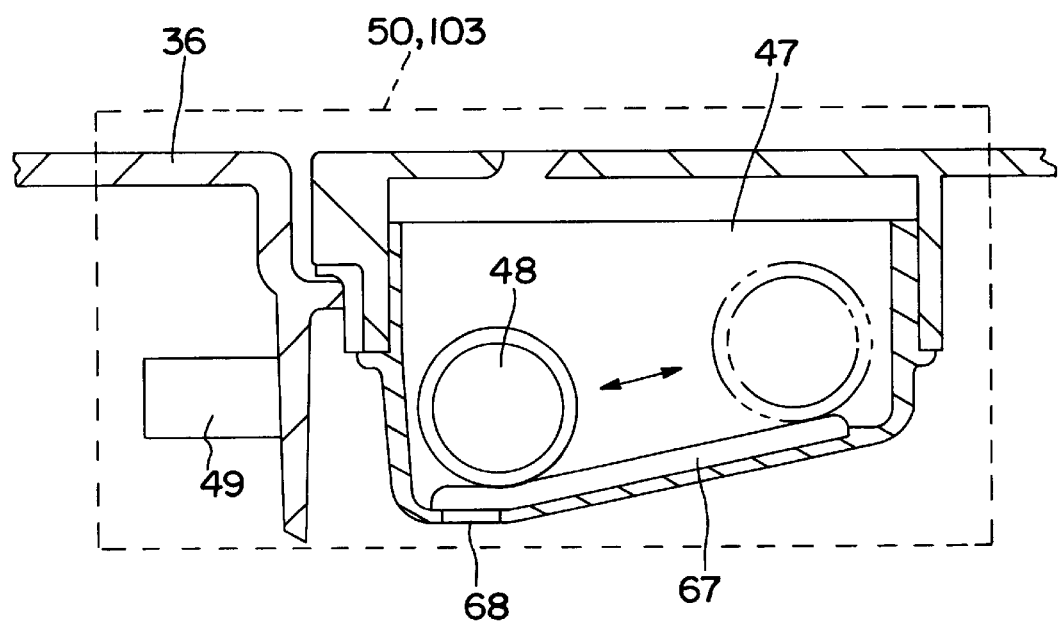
FIG. 4 is an essential magnified sectional view showing the lid opening and closing detecting means used also as rice gruel detecting means of this rice cooker.

FIG. 4 is a magnified sectional view of the lid opening and closing detecting means 50. In the lid opening and closing detecting means 50, the float 48 movable when opening or closing the lid 36 is provided inside the steam tube 47, the float detecting unit 49 for detecting the move or presence or absence of the float 48 is disposed ahead of the lid around the steam tube 47, and opening or closing of the lid 36 is detected by making use of the move of the float 48 moving to the hinge 38 side when the lid 38 is opened. Also by the presence or absence of the float 48, it is detected whether the steam tube 47 is attached or detached.

In the steam tube 47, a groove 67 for guiding the move of the float 48 is provided at the lower side of the slope, and a steam blow outlet 68 is provided at the lowest part of the slope. The float 48 is formed of a cylindrical or spherical magnet, and a convex part to be guided by the groove 67 when moving is provided over the entire circumference. The float 48 is disposed to cover the upper part of the steam blow outlet 68 in the closed state of the lid 36.

The float detecting unit 49 is, for example, a lead switch for opening or closing the contact by the magnetism of the float 48. Since the float 48 sits on the inclined groove 67, when the lid 36 is closed, the float 48 moves to the float detecting unit 49 side, and when the lid 36 is open, to the contrary, the float 48 moves to the opposite side of the float detecting unit 49. By such move of the float 48, the effect of the magnetism on the float detecting unit 49 changes, and the contact of the float detecting unit 49 opens or closes, so that opening or closing of the lid 36 can be detected.

Relating to the rice gruel detection which is described later, the groove 67 of the steam tube 47 forms a path of rice gruel when rice gruel is generated, and it also prevents the float 48 from being unable to move due to rice gruel. In the case of rice gruel detection, concerning the constitution of the float 48, for example, by using a photo sensor in the float detecting unit 49, the presence of the float 48 may be detected by presence or absence of its reflection, and anyway the float 48 is set at such a weight as not to be moved by the steam alone but to be moved by the rise of the rice gruel, and at a proper inclination angle of the bottom of the steam tube 47. As the relation between the weight and others and the rice gruel, according to the experiment, when using a columnar float, at the bottom angle of about 12°, the weight of about 2 to 4 g is found to be appropriate for boiling-over in rice cooking.

The float detecting unit 49 detects the move of the float 48, and controls supply of high frequency power to the heating means 33 comprising a heating coil depending on the detected data (opening or closing of lid, rise of rice gruel, etc.). That is, when cooking rice, as the rice gruel flows in from the steam blow outlet 68, the rice gruel is collected in the lower part of the float 48, and by elevation of internal pressure, the float 48 moves upward along the slope, and the float detecting unit 49 is actuated to control the electric power.

In this embodiment, the opening or closing of the lid 36 is detected by making use of the float 48 provided in the steam tube 47 which departs from the float detecting unit 49 when the lid 36 is opened, but other detecting means than the float may be also used. Herein, difference between rice gruel and steam is detected by the motion of the float, but not always depending on dynamic motion, it may be designed to detect by making use of viscosity of rice gruel, or physical difference such as thermal capacity.

In thus constituted rice cooker, the operation is described below.

The microcomputer 43, while receiving the output signal of open state of the lid 36 from the float detecting unit 49 as the lid opening and closing detecting means 50, does not accept signals received from the operation means 46 disposed on the top of the lid 36, such as rice cooking key 58, reserve key 59, hot keeping key 60, cancel key 61, hot keeping course key 62, freshness key 63, menu key 64, hour key 65 or minute key 66, and does not change the state of the rice cooker.

Thus, according to the embodiment, when closing the lid 36 after putting rice and water into the inner pan 32 by opening the lid 36 and putting into the main body 31, the upper front part of the lid 36 must be pressed, and at this time if the rice cooking key 58, for example, is touched by finger by mistake, pressing of the rice cooking key 58 is not accepted by the microcomputer 43, and hence rice cooking is not started. Therefore, if the operation means 46 is disposed in the upper front part of the lid 36, malfunction can be prevented in case the operation means 46 is touched by mistake when closing the lid 36.

Embodiment 2

A second embodiment is described by referring to FIG. 1 to FIG. 4. The constitution is same as in embodiment 1, and only the operation is described below.

The microcomputer 43, while receiving the output signal of open state of the lid 36 from the float detecting unit 49 as the lid opening and closing detecting means 50, does not accept the signal sent from the rice cooking key 58 in the operation means 46 disposed on the top of the lid 36, and does not change the state of the rice cooker.

Thus, according to the embodiment, when closing the lid 36 after putting rice and water into the inner pan 32 by opening the lid 36 and putting into the main body 31, the upper front part of the lid 36 must be pressed, and at this time if the rice cooking key 58 is touched by finger by mistake, pressing of the rice cooking key 58 is not accepted by the microcomputer 43, and hence rice cooking is not started. Therefore, if the rice cooking key 58 is disposed in the upper front part of the lid 36, malfunction can be prevented in case the rice cooking key 58 is touched by mistake when closing the lid 36, while other keys are accepted, and therefore, for instance, after removing the inner pan 32 from the main body 31 by opening the lid 36 while keeping hot the cooked rice, if desired to cancel hot keeping, it is possible to cancel hot keeping by pressing the cancel key 61 while the lid 36 is open.

Moreover, in case the lid opening and closing detecting means 50 fails during rice cooking or hot keeping, the rice cooking state or hot keeping state can be canceled by the cancel key 61, so that power feed to the heating means 33 can be stopped.

Embodiment 3

A third embodiment is described by referring to FIG. 1 to FIG. 4. The constitution is same as in embodiment 1, and only the operation is described below.

The microcomputer 43, while receiving the output signal of open state of the lid 36 from the float detecting unit 49 as the lid opening and closing detecting means 50, issues a signal for displaying the open state of the lid 36 to the LCD 44, does not accept signals received from the operation means 46 disposed on the top of the lid 36, such as rice cooking key 58, reserve key 59, hot keeping key 60, cancel key 61, hot keeping course key 62, freshness key 63, menu key 64, hour key 65 or minute key 66, and does not change the state of the rice cooker.

Thus, according to the embodiment, when closing the lid 36 after putting rice and water into the inner pan 32 by opening the lid 36 and putting into the main body 31, the upper front part of the lid 36 must be pressed, and at this time if the rice cooking key 58, for example, is touched by finger by mistake, pressing of the rice cooking key 58 is not accepted by the microcomputer 43, and hence rice cooking is not started. Therefore, if the operation means 46 is disposed in the upper front part of the lid 36, malfunction can be prevented in case the operation means 46 is touched by mistake when closing the lid 36.

Moreover, by the display of the LCD 44, if the key operation is not accepted by pressing a key in the operation unit in the open state of the lid 36, the user may not have wrong idea of trouble. To the contrary, it is known that the lid opening and closing detecting means 50 is defective.

Embodiment 4

A fourth embodiment is described by referring to FIG. 1 to FIG. 4. The constitution is same as in embodiment 1, and only the operation is described below.

The microcomputer 43, while receiving the output signal of open state of the lid 36 from the float detecting unit 49 as the lid opening and closing detecting means 50, does not accept signals received from the operation means 46 disposed on the top of the lid 36, such as rice cooking key 58, reserve key 59, hot keeping key 60, cancel key 61, hot keeping course key 62, freshness key 63, menu key 64, hour key 65 or minute key 66, but issues a signal to the buzzer 45 as the noticing means 55 to actuate it, and does not change the state of the rice cooker.

Thus, according to the embodiment, when closing the lid 36 after putting rice and water into the inner pan 32 by opening the lid 36 and putting into the main body 31, the upper front part of the lid 36 must be pressed, and at this time if the rice cooking key 58, for example, is touched by finger by mistake, pressing of the rice cooking key 58 is not accepted by the microcomputer 43, and hence rice cooking is not started. Therefore, if the operation means 46 is disposed in the upper front part of the lid 36, malfunction can be prevented in case the operation means 46 is touched by mistake when closing the lid 36, and if a key in the operation unit is pressed while the lid 36 is open, it is noticed that the key operation is not accepted.

Embodiment 5

A fifth embodiment is described by referring to FIG. 1 to FIG. 4. The constitution is same as in embodiment 1, and only the operation is described below.

The microcomputer 43, while receiving the output signal of open state of the lid 36 from the float detecting unit 49 as the lid opening and closing detecting means 50, does not accept, for about a second after the output signal is changed over to an output signal of open state of the lid 36, signals received from the operation means 46 disposed on the top of the lid 36, such as rice cooking key 58, reserve key 59, hot keeping key 60, cancel key 61, hot keeping course key 62, freshness key 63, menu key 64, hour key 65 or minute key 66, and does not change the state of the rice cooker.

Thus, according to the embodiment, the float 48 moves on the groove 67 when opening or closing the lid 36, but if moving to the float detecting unit 49 side before the lid 36 is closed, or if a closed state signal is issued although the lid 36 is not fully closed due to detecting precision of the float detecting unit 49, when closing the lid 36 after putting rice and water into the inner pan 32 by opening the lid 36 and putting into the main body 31, the upper front part of the lid 36 must be pressed, and at this time if the rice cooking key 58, for example, is touched by finger by mistake, pressing of the rice cooking key 58 is not accepted by the microcomputer 43, and hence rice cooking is not started. Therefore, if the operation means 46 is disposed in the upper front part of the lid 36, malfunction can be prevented in case the operation means 46 is touched by mistake when closing the lid 36.

Embodiment 6

A sixth embodiment is described by referring to FIG. 1 to FIG. 4. The constitution is same as in embodiment 1, and only the operation is described below.

The microcomputer 43, while receiving the output signal of open state of the lid 36 from the float detecting unit 49 as the lid opening and closing detecting means 50, does not accept a signal sent from the rice cooking key 58 in the operation means 46 disposed on the top of the lid 36, and does not change the state of the rice cooker. In this state, however, the microcomputer 43, when receiving the signal sent from the rice cooking key 58 three times consecutively within 3 seconds, accepts the signal and starts to cook rice.

Thus, according to the embodiment, when closing the lid 36 after putting rice and water into the inner pan 32 by opening the lid 36 and putting into the main body 31, the upper front part of the lid 36 must be pressed, and at this time if the rice cooking key 58, for example, is touched by finger by mistake, input is not accepted by the microcomputer 43 if pressed only once, and hence rice cooking is not started. Therefore, if the rice cooking key 58 is disposed in the upper front part of the lid 36, malfunction can be prevented in case the rice cooking key 58 is touched by mistake when closing the lid 36. If the lid opening and closing detecting means 50 is defective, by pressing the rice cooking key 58 three times consecutively, rice cooking can be normally started.

Embodiment 7

A seventh embodiment is described by referring to FIG. 1 to FIG. 4. The constitution is same as in embodiment 1, and only the operation is described below by referring to FIG. 5.

Figure 5:
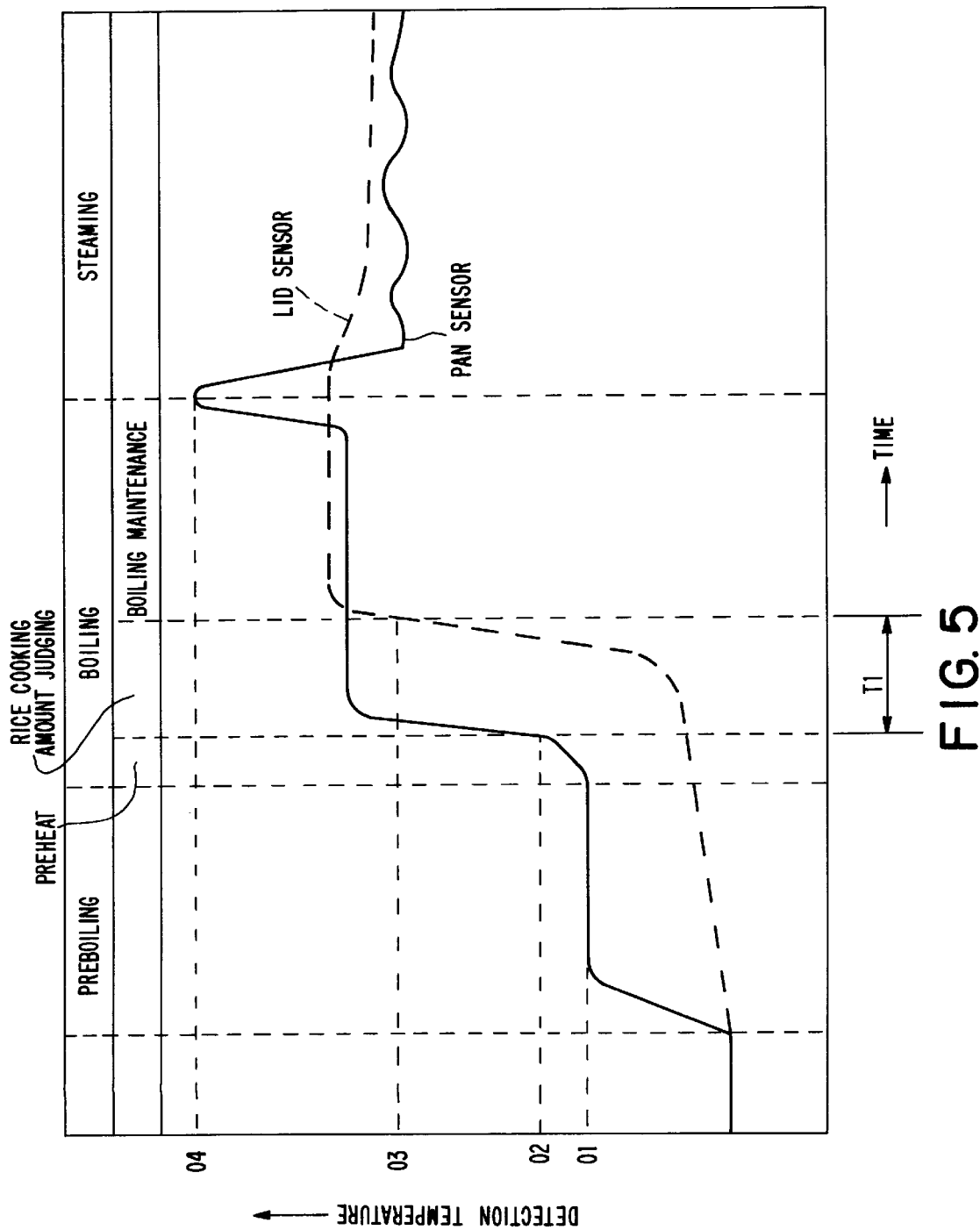
FIG. 5 is a diagram showing the rice cooking sequence of this rice cooker.

FIG. 5 shows the rice cooking sequence when cooking rice in the rice cooker of the embodiment of the invention, and detection temperature of the pan sensor 35 and lid sensor 41. The solid line in FIG. 5 shows the detection temperature of the pan sensor 35, and the dotted line indicates the detection temperature of the lid sensor 41. In the rice cooking amount judging step, the rice cooking amount in the inner pan 32 is judged by the time T1 from the detection temperature of the pan sensor 35 reaching specified temperature θ 2 till the detection temperature of the lid sensor 41 reaching specified temperature θ 3, and thereafter promoting the boiling maintenance step while adjusting the heating output depending on the rice cooking amount, the operation goes to the steaming step when the detection temperature of the pan sensor 35 reaches specified temperature θ 4.

Herein, if the lid 36 is opened in the midst of the rice cooking amount judging step, the lid sensor 41 cannot detect the normal temperature in the inner pan 32, and the time T1 until the detection temperature reaches specified time θ 3 becomes longer, and the rice cooking amount cannot be judged correctly. Accordingly, the microcomputer 43, if receiving an output signal of open state of the lid 36 from the float detecting unit 49 as the lid opening and closing detecting means 50 in the rice cooking amount judging step while cooking rice, issues a signal to the buzzer 45 as the noticing means 55 to actuate it.

Thus, according to the embodiment, in case the lid 36 is opened in the midst of the rice cooking amount judging step while cooking rice, the buzzer 45 sounds to tell that the normal rice cooking amount cannot be judged, so that the rice cooking amount can be adjusted always correctly to cook rice deliciously.

Embodiment 8

Figure 6:
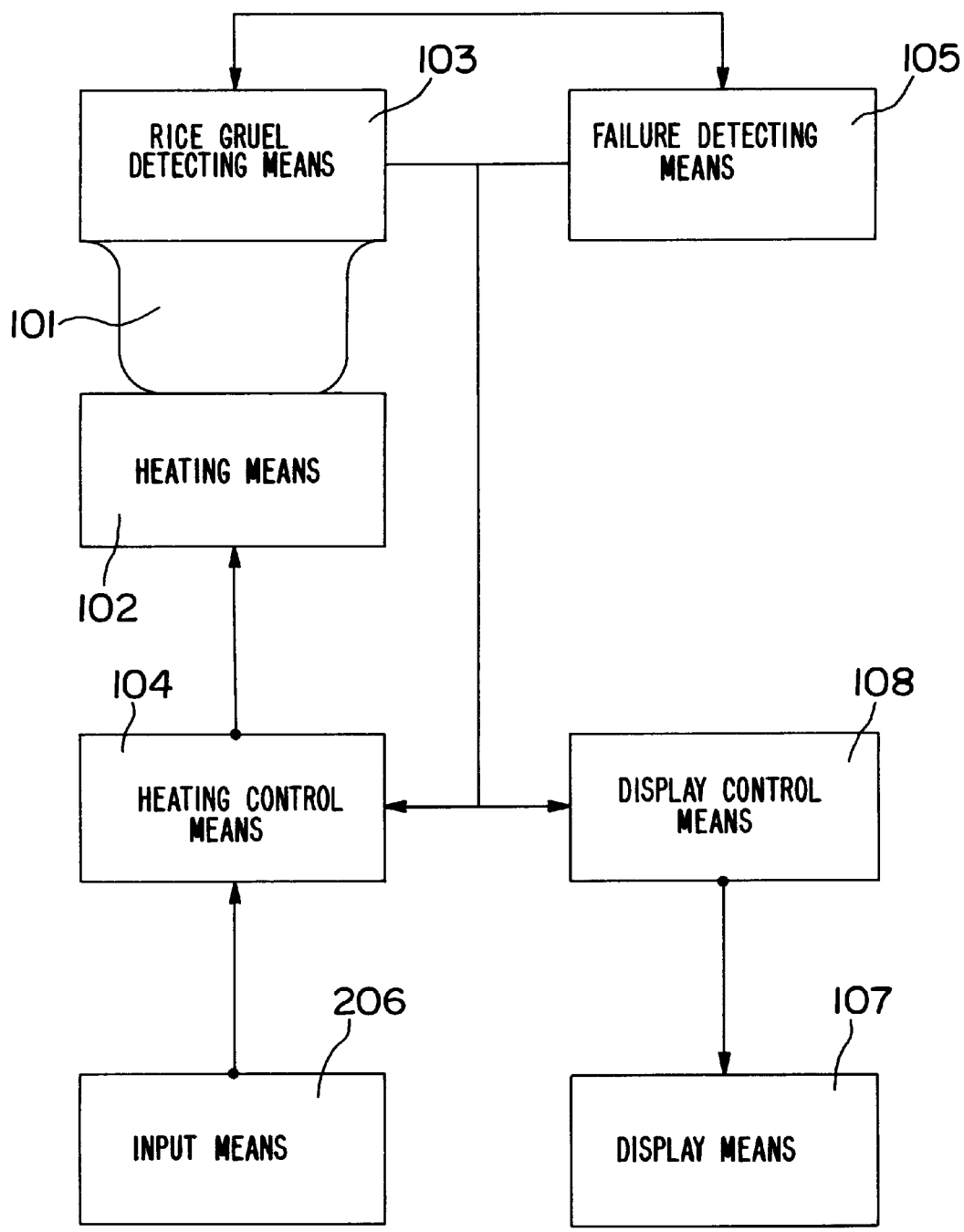
FIG. 6 is a block diagram of a rice cooker in embodiments 8 to 19 of the invention.
Figure 7A:
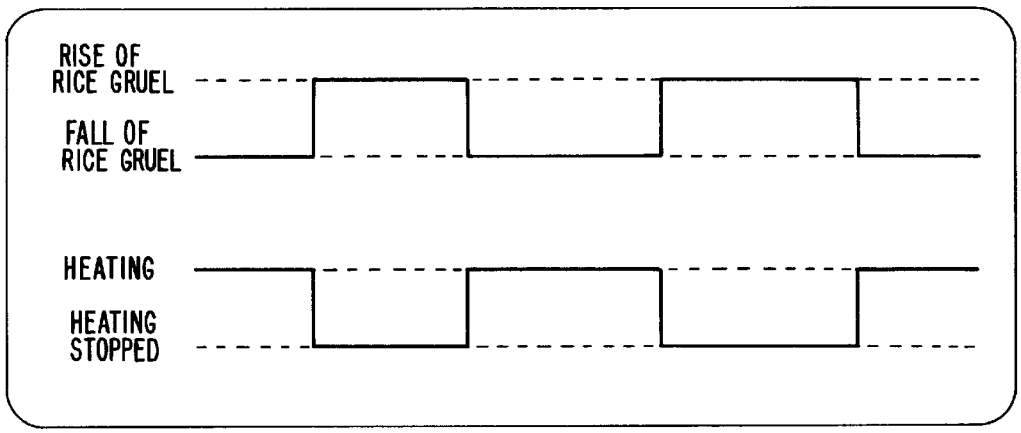
FIG. 7 is an operation waveform diagram of this rice cooker.
Figure 7B:
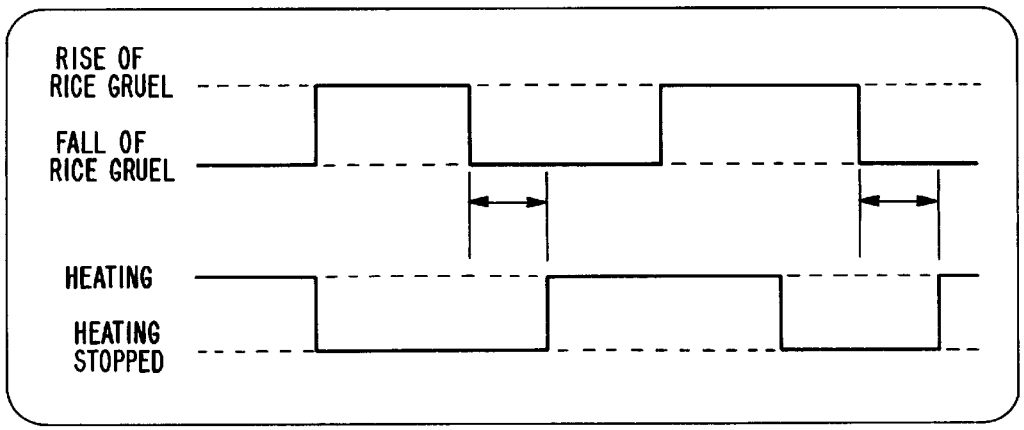
Figure 7C:
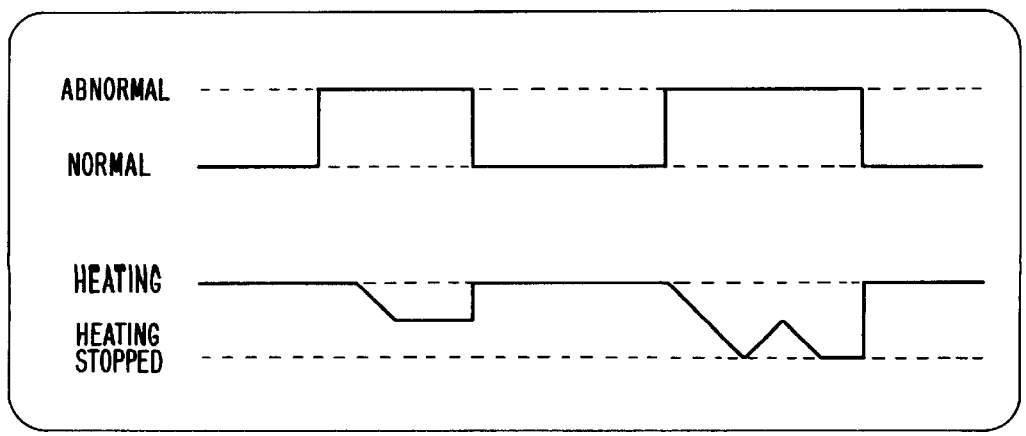
Figure 8:
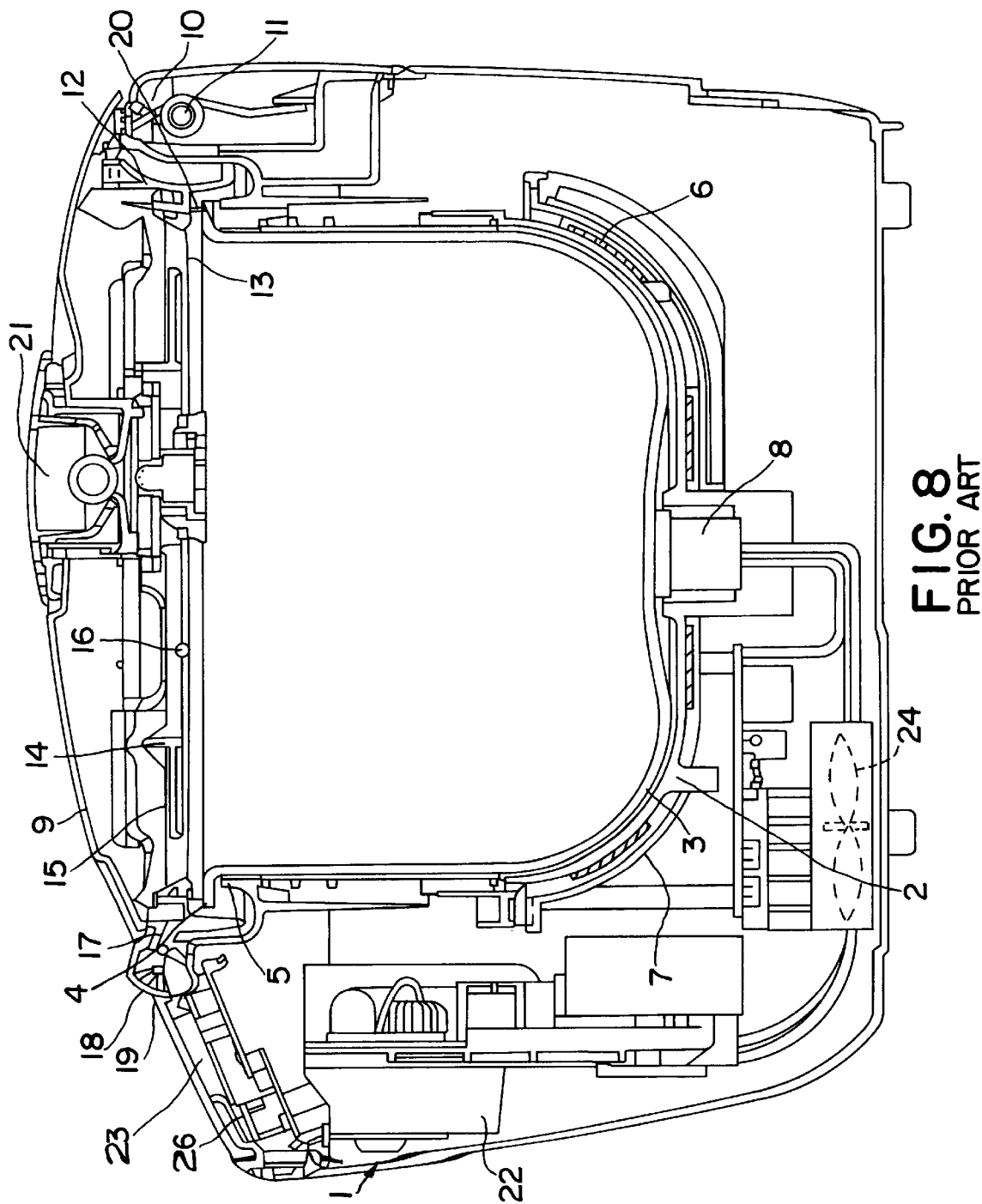
FIG. 8 is a longitudinal sectional view of a conventional rice cooker.

An eighth embodiment of the invention is described by referring to FIG. 6 and FIG. 7 (*a*), FIG. 7 (*b*), FIG. 7 (*c*). The specific constitution of the rice cooker and rice gruel detecting means is same as in FIG. 1 and FIG. 4, and description is omitted. Specific examples of the time, temperature or step are only arbitrary and may be executed by setting freely.

In FIG. 6, reference numeral 101 is an inner pan for containing the material, and the inner pan 101 is heated by heating means 102. Rice gruel detecting means 103 is for detecting liquid or solid rice gruel. Heating control means 104 is for controlling the heating means 102 depending on the result of detection by the rice gruel detecting means 103.

In thus constituted rice cooker, the operation is described below. When heating by the heating means 102 is started, the material and water in the inner pan 101 move up along with heating. When rising to a specified position, it is detected by the rice gruel detecting means 103, and the heating control means 104 varies the heating capacity of the heating means 102, thereby suppressing boiling-over.

Embodiment 9

A ninth embodiment is described. This rice cooker is same in constitution as in the eighth embodiment, and only the operation is described below. FIG. 7 (*a*) shows the relation between the detection result by the rice gruel detecting means 103 and the operation of the heating means 102. The heating control means 104 stops the heating means 102 when rise of rice gruel is detected by the rice gruel detecting means 103, and increases the heating capacity when fall of rice gruel is detected.

Embodiment 10

A tenth embodiment is described. This rice cooker is same in constitution as in the eighth embodiment, and only the operation is described below. FIG. 7 (*b*) shows the relation between the detection result by the rice gruel detecting means 103 and the operation of the heating means 102. The heating control means 104 stops the heating means 102 when rise of rice gruel is detected by the rice gruel detecting means 103, and increases the heating capacity, after a waiting time for several seconds, when fall of rice gruel is detected.

Embodiment 11

An eleventh embodiment is described. In FIG. 6, failure detecting means 105 is for detecting abnormality of the rice gruel detecting means. Same reference numerals as in the eighth embodiment are common parts.

In thus constituted rice cooker, the operation is described. When the failure detecting means 105 detects abnormality of the rice gruel detecting means 103, the heating control means 104 controls the heating means 102, and suppresses boiling-over by decreasing the heating capacity to such an extent as to maintain the rice cooking performance as shown in FIG. 7 (*c*).

Embodiment 12

A twelfth embodiment is described. This rice cooker is same in constitution as in the eleventh embodiment, and only the operation is described below. When starting rice cooking operation, if the failure detecting means 105 detects abnormality of the rice gruel detecting means 103, the heating control means 104 stops starting the rice cooking operation.

Embodiment 13

A thirteenth embodiment is described. In FIG. 6, input means 106 is for entering into the heating control means 104. Same reference numerals as in the eighth embodiment or eleventh embodiment are common parts, and description is omitted.

In thus constituted rice cooker, the operation is described. When the failure detecting means 105 detects abnormality of the rice gruel detecting means 103, a first input from the input means 106 is ignored, and the state of the rice cooker is changed only by a second input. Similarly, not limited to second input, the state of the rice cooker may be changed only by an arbitrary plurality of inputs.

Embodiment 14

A fourteenth embodiment is described. This rice cooker is same in constitution as in the thirteenth embodiment, and only the operation is described below. When the failure detecting means 105 detects abnormality of the rice gruel detecting means 103, a first input from the input means 106 is ignored, and measuring of time is started from that moment. If the input is entered by a specified number of times within 10 seconds, such input is validated, and the state of the rice cooker is changed. If passing over 10 seconds until the input is terminated, all inputs entered so far are invalidated, and a next input is regarded as a first input in the subsequent operation.

Not limited to the duration from the first time until reaching a specified number, it is possible to start and end measurement of the time from an arbitrary number of times, and the number of times of measurement for reaching a specified time is not limited to once only.

Embodiment 15

A fifteenth embodiment is described. This rice cooker is same in constitution as in the eleventh embodiment, and only the operation is described below. The failure detecting means 105 measures the continuous rise time of rice gruel when rise of rice gruel is detected by the rice gruel detecting means 103. Usually, when the continuous rise of rice gruel is about 5 seconds to 10 seconds, if continuous rise of rice gruel is detected for 30 seconds, it is judged that the rice gruel detecting means 103 is abnormal, and the heating control means 104 controls the heating means 102, and suppresses boiling-over by decreasing the heating capacity to such as an extent as to maintain the rice cooking performance as shown in FIG. 7 (c).

Embodiment 16

A sixteenth embodiment is described. This rice cooker is same in constitution as in the eighth embodiment, and only the operation is described below. The heating control means 104, only when the pan bottom temperature in the rice cooker is in a range of 90° C. to 110° C., decreases the heating capacity by the heating means 102 when rise of rice gruel is detected by the rice gruel detecting means 103, and in other range it does not vary the heating capacity by the detection result by the rice gruel detecting means 103. Meanwhile, the temperature may be measured at any arbitrary point in the rice cooker.

Embodiment 17

A seventeenth embodiment is described. This rice cooker is same in constitution as in the eighth embodiment, and only the operation is described below. The heating control means 104, only when the rice cooking time is in a range of 10 minutes to 50 minutes, decreases the heating capacity by the heating means 102 when rise of rice gruel is detected by the rice gruel detecting means 103, and in other range it does not vary the heating capacity by the detection result by the rice gruel detecting means 103.

Embodiment 18

A eighteenth embodiment is described. This rice cooker is same in constitution as in the eighth embodiment, and only the operation is described below. The heating control means 104, only when the rice cooking step is in the boiling maintenance step, decreases the heating capacity by the heating means 102 when rise of rice gruel is detected by the rice gruel detecting means 103, and in other range it does not vary the heating capacity by the detection result by the rice gruel detecting means 103. Meanwhile, this can be executed in plural steps from start of rice cooking until completion.

Embodiment 19

A nineteenth embodiment is described. In FIG. 6, display means 107 is to display or notice the state of the rice cooker, and display control means 108 is to control the display means 107. Same reference numerals as in the eighth embodiment or eleventh embodiment are common parts, and description is omitted.

In thus constituted rice cooker, the operation is described. When detected by the rice gruel detecting means 103, the display control means 108 displays presence or absence of rise of rice gruel by the display means 107. When rise of rice gruel is detected, it is also noticed by the sound of the buzzer.

Not limited to display and notice in part of the rice cooker, or to the state of the rice gruel detecting means 103 for presenting display or notice, various arbitrary forms may be considered. Besides, instead of the rice gruel detecting means 103, similar operation may be realized by failure detecting means 105.

What is claimed is:

1. A rice cooker comprising:

a rice cooker main body;

a lid covering the rice cooker main body;

a lid detector to detect an open and close state of the lid;

an inner pan detachably accommodated in the rice cooker main body;

heating means for heating the inner pan;

control means for supplying and controlling electric power to the heating means, and for receiving a signal from the lid detector indicating an open or close state of the lid; and an operation unit for instructing a start of rice cooking and for instructing a selection of a rice cooking function, wherein the control means is adapted to inhibit at least one instruction input of the operation unit if an open state of the lid is detected by the lid detector.

2. A rice cooker of claim 1, wherein the control means inhibits input instruction to start the rice cooking when detecting an open state of the lid.

3. A rice cooker of claim 1, further comprising display means for displaying the state of the rice cooking function and the open or closed state of the lid.

4. A rice cooker of claim 1, wherein the control means determines when a manipulation signal of the operation unit is entered when the lid is open.

5. A rice cooker of claim 1, wherein the control means inhibits input of a manipulation signal of the operation unit for a specific time even after the lid is closed.

6. A rice cooker of claim 1, wherein the control means permits an input of a manipulation signal of the operation unit, if the lid is open, as far as a specific manipulation signal of the operation unit is entered.

7. A rice cooker of claim 1, wherein the control means determines when the open state of the lid is detected for a specific time in a specific process during rice cooking.

8. A rice cooker comprising:

an inner pan for containing the material;

heating means for heating the inner pan;

rice gruel detecting means for detecting a rise of rice gruel above an upper end of the inner pan; and heating control means for controlling the heating means, wherein the heating control means changes the heating capacity of the heating means depending on the state of detection by the rice gruel detecting means.

9. A rice cooker of claim 8, wherein the heating control means stops heating during detection of the rice gruel by the rice gruel detecting means.

10. A rice cooker of claim 8, wherein the heating control means stops heating for a specific time after detection by the rice gruel detecting means that the rice gruel is no longer rising.

11. A rice cooker of claim 8, further comprising failure detecting means for detecting failure of the rice gruel detecting means, wherein the heating control means changes the heating capacity of the heating means when a failure is detected by the failure detecting means.

12. A rice cooker of claim 11, wherein the heating control means does not start the rice cooking operation when a failure is detected by the failure detecting means.

13. A rice cooker of claim 11, further comprising input means for entering into the heating control means, wherein the heating control means is constituted so as to change the state of the rice cooker by input of plural times when failure is detected by the failure detecting means.

14. A rice cooker of claim 13, wherein the heating control means is constituted so as to invalidate the inputs made so far when input of plural times is not done within a specific time.

15. A rice cooker of claim 11, wherein the failure detecting means judges a failure when a rise of rice gruel is detected continuously for more than a specific time by the rice gruel detecting means.

16. A rice cooker of claim 8, wherein the heating control means controls the heating means, regardless of the detecting result of the rice gruel detecting means, when the temperature in the rice cooker is within a specified range.

17. A rice cooker of claim 8, wherein the heating control means controls the heating means, regardless of the detecting result of the rice gruel detecting means, when the cooking time is within a specified range.

18. A rice cooker of claim 8, wherein the heating control means controls the heating means, regardless of the detecting result of the rice gruel detecting means, in a specific rice cooking process.

19. A rice cooker of claim 8, further comprising display means for displaying the state of the rice cooker, and display control means for controlling the display means, wherein the display control means changes the operation of the display means depending on at least one detection state of the rice gruel detecting means and failure detecting means.

* * * * *